United States Patent Office 2,895,499
Patented July 21, 1959

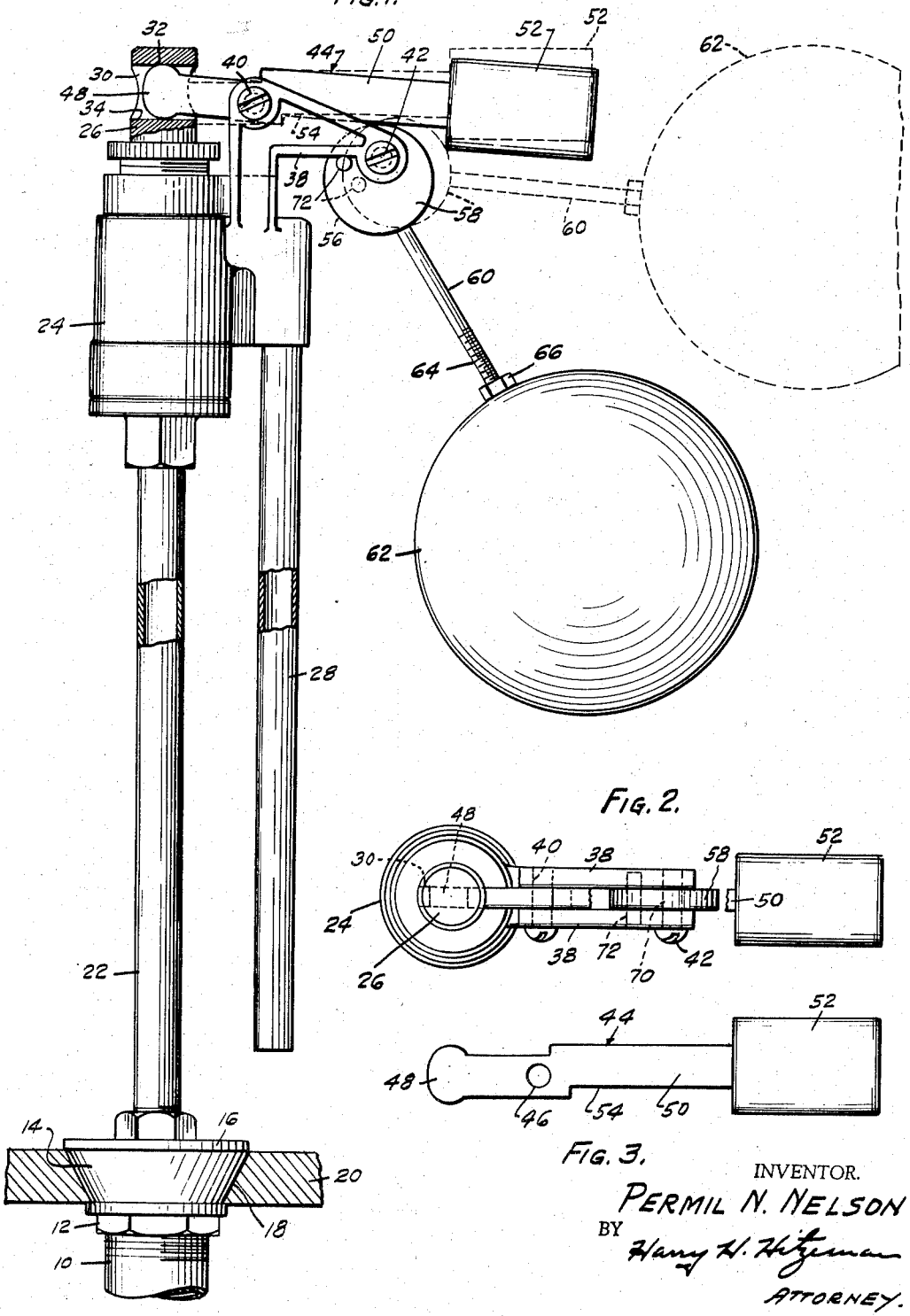
*July 21, 1959*  P. N. NELSON  2,895,499
ECCENTRICALLY MOUNTED FLOAT BALL INLET VALVE OPERATING
MECHANISM FOR FLUSH TOILETS
Filed Nov. 14, 1957
INVENTOR.
PERMIL N. NELSON
BY
ATTORNEY.

2,895,499

ECCENTRICALLY MOUNTED FLOAT BALL INLET VALVE OPERATING MECHANISM FOR FLUSH TOILETS

Permil N. Nelson, Galesburg, Ill., assignor to Lynn H. Ewing, Rock Island, Ill.

Application November 14, 1957, Serial No. 696,488

1 Claim. (Cl. 137—425)

My invention relates to float ball valve operating mechanism.

My invention relates more particularly to float ball valve operating mechanism for flush toilets. These valves are usually opened by the lowering of a float ball when a toilet is flushed, permitting water to enter the reservoir of a closet bowl to a level determined by the raising of the float ball to close the valve and stop further supply of water from the plumbing system.

The principal object of the present invention is to provide a comparatively simple, yet highly efficient construction of float ball and operating lever for opening or closing the inlet valve to control the flow of water into the reservoir of a flush toilet from the inlet line of the plumbing system.

A further object of the invention is to provide an eccentrically mounted float ball which cooperates with a valve actuating lever to open or close the valve mechanism in accordance with the operation of a float ball.

A further object is to provide a combination of weighted valve operating lever and eccentrically mounted float ball so coordinated that the weighted valve operating lever will co-act with the float ball mechanism when the level of water in the reservoir is being lowered to open the valve to permit ingress of water from the plumbing system, the eccentric mounting of the float ball being such that its cooperation with the pivoted valve lever will actuate the same to shut the valve when the desired level of water in the reservoir has been reached.

Advantages of this construction are that the combination of parts above described afford great leverage from a comparatively short pivot which is applied to close the valve against the pressure in the plumbing system, and when the valve is being opened the weighted lever operates by gravity, assisted by the force in the plumbing system, to easily and quickly open the same.

Other advantages will be more apparent from the following description wherein reference is had to the accompanying sheet of drawings, upon which:

Fig. 1 is a side elevational view of a float valve assembly shown mounted in the water closet tank or reservoir with the inlet valve open;

Fig. 2 is a plan view of the valve, valve housing, and valve operating lever with parts broken in section to show the disc for the float ball stem mounted between the arms on the valve housing; and Fig. 3 is a side elevational view of the valve operating lever which I employ.

In the embodiment of the invention which I have chosen to illustrate and describe the same, I have shown the usual water supply conduit or inlet line 10 from the plumbing system of the building, the same being fastened by means of lock nuts 12, gasket 14 and standpipe connector 16 through a suitable opening 18 in the floor 20 of a water closet reservoir. A vertical standpipe 22 may extend upwardly from the connector 16 and be connected to the lower end of a valve housing 24 in which a reciprocally operating plug valve 26 is mounted, the plug valve 26 being raised or lowered to shut off or permit water to flow up through standpipe 22 and out from the valve housing 24 through a discharge pipe 28. In the full line position of the parts shown in Fig. 1, the plug valve 26 has been lifted so that water is now flowing up through the vertical standpipe 22, through the valve housing 24 and out through the discharge 28.

The plug valve 26 has a slot 30 extending therethrough, the slot having an upper wall 32 and a lower wall 34. The valve housing 24 has integrally formed therewith a pair of upstanding and outwardly projecting pivot arms 38, the arms 38 having a pivot 40 positioned therein at their upper ends and a second pivot 42 positioned therein at the outer extremity of the same.

I provide a valve operating lever 44, the lever having an opening 46 to receive the pivot 40. The lever has one end formed with a rounded head 48 which is positioned in the slot 30 of the plug valve 26 and capable of frictional contact with the wall 34 to press the valve shut, or with the wall 32 to move the valve open. The valve operating lever 44 has an upwardly offset extended arm 50 which has a weight 52 connected to the end of the same. The weight is of sufficient density so that without any support for the valve operating lever it would swing about its pivot 40 and open the valve 26.

The arm 50 may be offset as shown, and be provided with a bottom wall 54 that is normally in contact with the peripheral edge 56 of a disc-like member 58 that forms a support for the stem 60 of a hollow float ball 62. The stem 60 has an outer threaded portion 64 and the float ball 62 is provided with a nut portion 66 so the float ball may be moved away or toward its support disc 58 to adjust the same as desired.

The disc 58 is formed with an eccentrically positioned opening 70 to receive the pivot 42, and is also provided with a stop pin member 72 which, in the position shown in Fig. 1, limits the downward movement of the float ball 62 by striking against the lower sides of the extended pivot arms 38. In this position, as shown in full lines in Fig. 1, the plug valve is open and water is being received through the standpipe 22 and discharge pipe 28 into the water closet reservoir.

As the level of water rises in the reservoir, it will carry the float ball 62 to the dotted-line position shown in Fig. 1, and due to the eccentric mounting of the disc 58 it will swing about its pivot 42 and raise the valve operating lever 44 to the dotted-line position shown in Fig. 1, thereby closing off the plug valve 26 and stopping the flow of water into the reservoir.

From the above and foregoing description it can be seen that I have provided a very simple yet effectively operating float ball valve control in which, by means of an eccentrically mounted disc, the plug valve is moved to closed position, and by means of a weight on the valve operating lever, is quickly moved to an open position. Since the only moving parts are the valve operating lever 44 on the pivot 40 and the disc 58 on the pivot 42, it is obvious that there will be very little cause for the mechanism to become broken or out of order, and it is capable of long and continuous operation.

I contemplate that changes and modifications may be made in the exact details shown and I do not wish to be limited in any particular; rather what I desire to secure and protect by Letters Patent of the United States is:

The combination with a valve housing mounted at the upper end of an inlet conduit in a water closet reservoir and a vertically reciprocal plug valve mounted in said valve housing, said valve housing having a pair of spaced parallel arms extending upwardly and outwardly on one side of said housing to define an upper end and an outer end, a pair of pivot pins connected between said arms, one at the upper end and one at the outer end of said arms, of a valve operating lever mounted between said arms on the upper of said pivot pins, said lever having its ends extending in both directions from said pivot pin, said plug valve having a slot through the top end of the same, one end of said lever extending into said slot to raise or lower said plug valve, the other end extending away from said valve housing, a weight attached to the last named end of said lever, a float ball, a float ball stem, a disc eccentrically mounted on the pivot pin at the outer end of said arms, said float ball stem connected to the peripheral edge of said disc, said float ball adapted to raise or lower according to the level of water in said reservoir and capable, when being raised, of raising said valve arm to close said plug valve, said disc having a stop pin connected thereto for engagement with the lower side of said valve housing arms to limit lowering movement of said float ball.

References Cited in the file of this patent

UNITED STATES PATENTS

| | | |
|---|---|---|
| 662,837 | Valiquette | Nov. 27, 1900 |
| 905,787 | Boggess | Dec. 1, 1908 |
| 967,432 | Powers | Aug. 16, 1910 |
| 1,158,743 | Swanberg | Nov. 2, 1915 |
| 1,762,306 | Mueller | June 10, 1930 |

FOREIGN PATENTS

| | | |
|---|---|---|
| 588,082 | France | Apr. 29, 1925 |